(No Model.)
F. A. TYLER.
COMBINED FLOUR RECEPTACLE AND SIFTER.
No. 360,065. Patented Mar. 29, 1887.
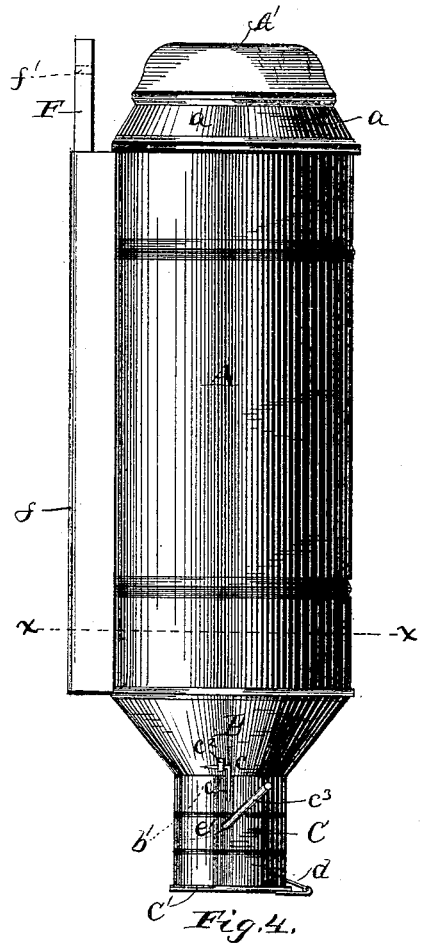
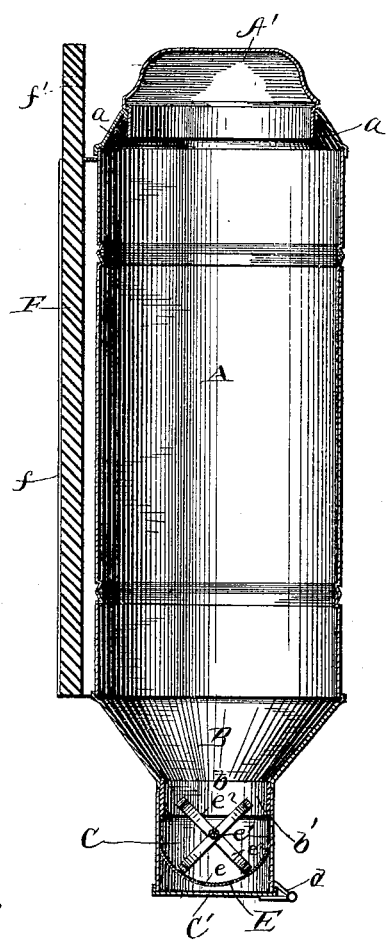
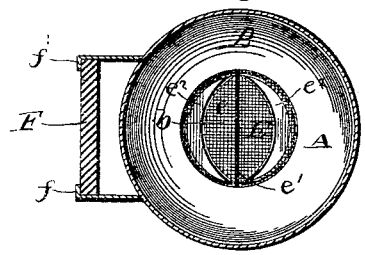
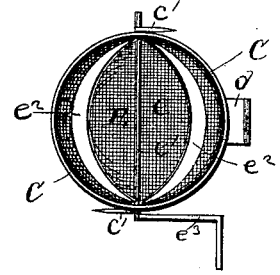
Witnesses
Inventor
Frederick A. Tyler
By his Attorneys

UNITED STATES PATENT OFFICE.

FREDERICK A. TYLER, OF ROME, NEW YORK.

COMBINED FLOUR RECEPTACLE AND SIFTER.

SPECIFICATION forming part of Letters Patent No. 360,065, dated March 29, 1887.

Application filed August 23, 1886. Serial No. 211,698. (No model.)

*To all whom it may concern:*

Be it known that I, FREDERICK A. TYLER, a citizen of the United States, residing at Rome, in the county of Oneida and State of New York, have invented a new and useful Improvement in Combined Flour Receptacles and Sifters, of which the following is a specification.

My invention relates to combined flour receptacles and sifters; and it consists of the peculiar construction and arrangement of parts, substantially as hereinafter fully described, and particularly pointed out in the claim.

In the accompanying drawings, Figure 1 is a side elevation of a flour or spice receptacle and sifter embodying my invention. Fig. 2 is a vertical central longitudinal sectional view thereof. Fig. 3 is a detached plan view of the removable discharge-throat, together with the sifting device. Fig. 4 is a transverse horizontal sectional view on the line $x\,x$ of Fig. 1.

Referring to the drawings, in which like letters of reference indicate corresponding parts in all the figures, A designates the receptacle or vessel proper, into which the flour or spices are to be emptied to preserve them in their natural state and exclude vermin, &c., therefrom. This receptacle is made cylindrical, square, or of any other desired form, and of metal or any suitable material. The capacity and size of the receptacle varies according to the substance to be stored or placed therein—as, for instance, if it is to contain flour, it is made of a size sufficiently large to hold a sack, or less, as may be desired.

The receptacle or receiver is placed in a vertical position, and the upper end thereof is contracted or reduced slightly by the inclined flange $a$, said end being left open for the admission of the contents of the receiver, and is closed by a removable cover, A', of any approved pattern.

The lower end of the vertical receiver is made conical in form, as at B, to provide a contracted discharge-opening, $b$, for the contents of the receiver, a vertical flange, $b'$, depending from the conical end B of the receiver, being of the same diameter as the discharge-opening.

C designates the removable discharge-throat, which is made cylindrical in form and of a diameter corresponding to or a little greater than the diameter of the depending flange $b'$, so that the upper end of the said throat will fit snugly over the depending flange, to which it is detachably connected by suitable locking devices, $c$, which consist, preferably, of hooks $c'$ and eyes or loops $c^2$, into which the hooks are fitted. The upper end of the discharge-throat is left open, so that the flange $b'$ can fit easily and snugly therein, and the lower end of the throat is also left open, and closed by means of a swinging cover, C', which is hinged or pivoted thereto at $d$, this cover being closed when the device is not in use to prevent more effectually the escape of the contents of the receiver. The removable discharge-throat carries the sifting devices E in its lower end for cleaning the contents of the receiver simultaneously with the discharge of the same from the receiver; and the said sifting device consists of a sieve, $e$, of fine mesh of wire, that is rigidly secured to the inner sides of the throat, and a rotary agitator-shaft, $e'$, that is suitably journaled in the discharge-throat and carries the blades $e^2$, which are rigidly affixed to the shaft, the said shaft having a crank-handle, $e^3$, at one end, which is to be grasped and rotated by the hand of the operator.

No novelty, however, is herein claimed on the particular form of sifting device, as I am aware that it is not broadly new.

On one of its sides the receiver has lateral flanges $f$, which are rigidly affixed thereto in any suitable manner, and said flanges are arranged parallel and out of contact with each other. Between these vertical parallel flanges $f$ is fitted and secured a back board, F, which lies flush with the rear edges of the flanges.

The upper end of the back board is extended above the flanges and has one or more transverse openings, $f'$, through which pass nails or hooks to suspend the receptacle from a wall or other suitable place in a kitchen, and when the receiver is so suspended the back board bears against the wall to steady the receiver and insure a firm support therefor. In lieu of thus suspending the receiver from a wall, it can be placed upon a tripod or other suitable support; but I have not deemed it necessary to illustrate the latter support herein, as it can be readily supplied by a skillful mechanic.

This being the construction of my improved flour and spice receptacle, the operation thereof is as follows: To fill the receptacle, the cover A' thereof is first removed, the flour or other substance poured therein, and the cover is replaced. To withdraw a portion of the contents from the receptacle for use, the swinging cover of the lower end of the discharge-throat is adjusted out of the way and the agitator-shaft rotated by grasping the crank-handle $e^3$, and thereby forcing the flour, &c., through the sieve, thus sifting the substance simultaneously with its discharge from the receiver, the swinging cover being returned by hand to its former closed position after the desired quantity of flour has been removed. In order to clean the throat C and the sifting devices carried thereby of any accumulations of dirt and other refuse matter, the receiver is first emptied and the locking devices disconnected, after which the throat is detached to permit free access thereto.

I do not desire to limit myself to the exact details of construction herein shown and described, as I am aware that changes therein can be made without departing from the spirit of my invention.

Having thus described my invention, what I claim as new, and desire to secure by Letters Patent, is—

The herein-described combined flour receptacle and sifter, comprising the vertical receiver having the contracted discharge end, a removable discharge-throat carrying a swinging cover at its lower end, the locking devices for detachably connecting the throat to the receiver, the screen housed within the throat, an agitator located above the screen, the vertical flanges affixed to the receiver, and the back board secured between the flanges, substantially as and for the purpose described.

In testimony that I claim the foregoing as my own I have hereto affixed my signature in presence of two witnesses.

FREDERICK A. TYLER.

Witnesses:
JOHN S. BAKER,
WILLIAM E. SCRIPTURE.